(12) United States Patent
Rey

(10) Patent No.: US 10,668,942 B2
(45) Date of Patent: Jun. 2, 2020

(54) POWER STEERING DEVICE WITH A REMOTE COMPUTER UNDER THE RACK

(71) Applicant: JTEKT EUROPE, Irigny (FR)

(72) Inventor: Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 120 days.

(21) Appl. No.: 15/743,379

(22) PCT Filed: Jul. 29, 2016

(86) PCT No.: PCT/FR2016/051982
§ 371 (c)(1),
(2) Date: Jan. 10, 2018

(87) PCT Pub. No.: WO2017/021636
PCT Pub. Date: Feb. 9, 2017

(65) Prior Publication Data
US 2018/0208234 A1 Jul. 26, 2018

(30) Foreign Application Priority Data

Jul. 31, 2015 (FR) ...................................... 15 57393

(51) Int. Cl.
*B62D 5/04* (2006.01)
*B62D 25/08* (2006.01)

(52) U.S. Cl.
CPC ......... *B62D 5/0406* (2013.01); *B62D 5/0403* (2013.01); *B62D 5/0421* (2013.01); *B60Y 2410/114* (2013.01); *B62D 25/082* (2013.01)

(58) Field of Classification Search
CPC ... B62D 5/0406; B62D 5/0403; B62D 5/0421
See application file for complete search history.

(56) References Cited

U.S. PATENT DOCUMENTS 5,573,079 A * 11/1996 Suda ................... B62D 5/0406
180/444
6,123,167 A * 9/2000 Miller .................. B62D 5/0406
180/443

(Continued)

FOREIGN PATENT DOCUMENTS

DE   10 2007 038 902 A1   2/2009
EP        2 514 654 A1   10/2012

OTHER PUBLICATIONS

Nov. 9, 2016 International Search Report issued in International Patent Application No. PCT/FR2016/051982.

(Continued)

*Primary Examiner* — Jacob D Knutson
*Assistant Examiner* — Michael R Stabley
(74) *Attorney, Agent, or Firm* — Oliff PLC

(57) ABSTRACT

The invention relates to a vehicle (2) provided with a power-steering device (1) which includes at least one steering rack (3) and an assistance motor (4) arranged to drive said steering rack (3), as well as at least one on-board computer (13) inside the vehicle (2), intended for controlling said assistance motor (4), the computer (13) being placed mostly, and preferably entirely, below the rack (3), preferably in a shell (20), inside of which the rack (3) is translatably guided, and inside of which a space for the computer is arranged for said purpose.

7 Claims, 3 Drawing Sheets

(56) References Cited

U.S. PATENT DOCUMENTS

| | | | | |
|---|---|---|---|---|
| 6,429,553 B1* | 8/2002 | Taniguchi | ............ | B62D 5/0406 |
| | | | | 180/400 |
| 6,695,091 B2* | 2/2004 | Achenbach | .......... | B62D 5/0406 |
| | | | | 180/444 |
| 8,485,306 B2* | 7/2013 | Shimizu | ............... | H02K 7/1166 |
| | | | | 180/444 |
| 9,168,947 B2* | 10/2015 | Shiino | ...................... | B62D 5/04 |
| 2013/0062137 A1 | 3/2013 | Motoda | | |
| 2013/0180794 A1* | 7/2013 | Shiino | ...................... | B62D 5/04 |
| | | | | 180/444 |

OTHER PUBLICATIONS

Miller et al.; "Das Sicherheitskonzept Der Elektromechanischen Servolenkung Mit Zahnstangenantrieb;" Atz—Automobiltechnische Zeitschrift, Springer Professional; vol. 101, No. 11; Nov. 1, 1999, pp. 910-912.

\* cited by examiner

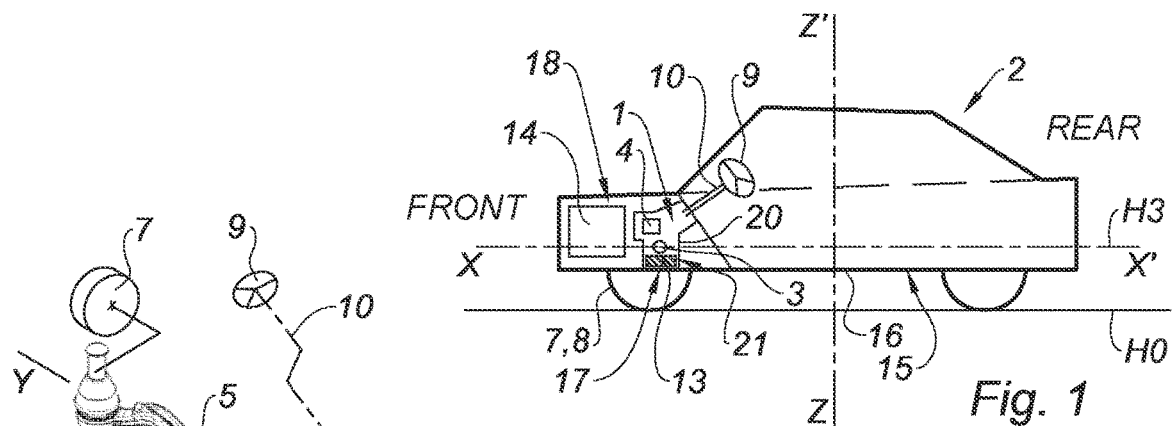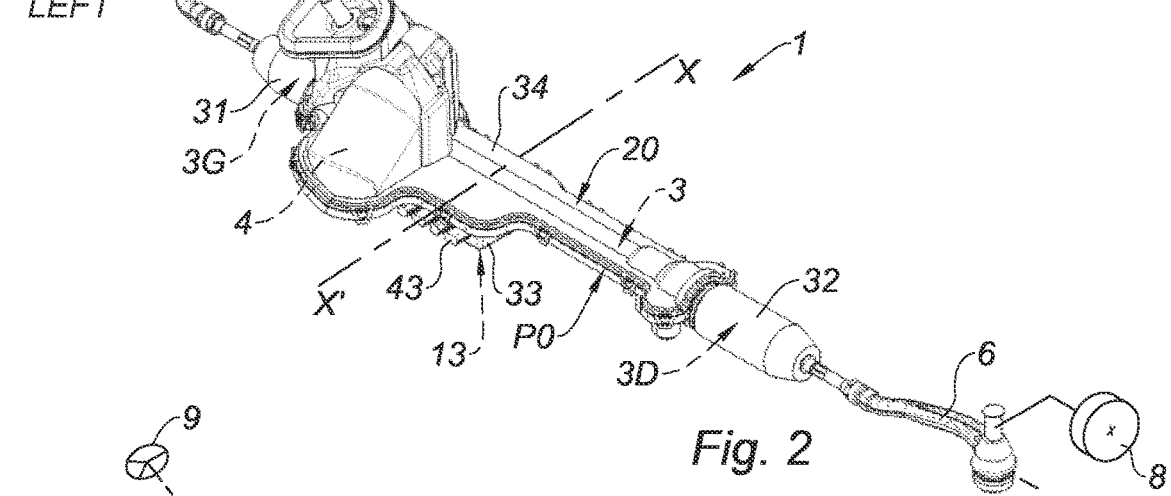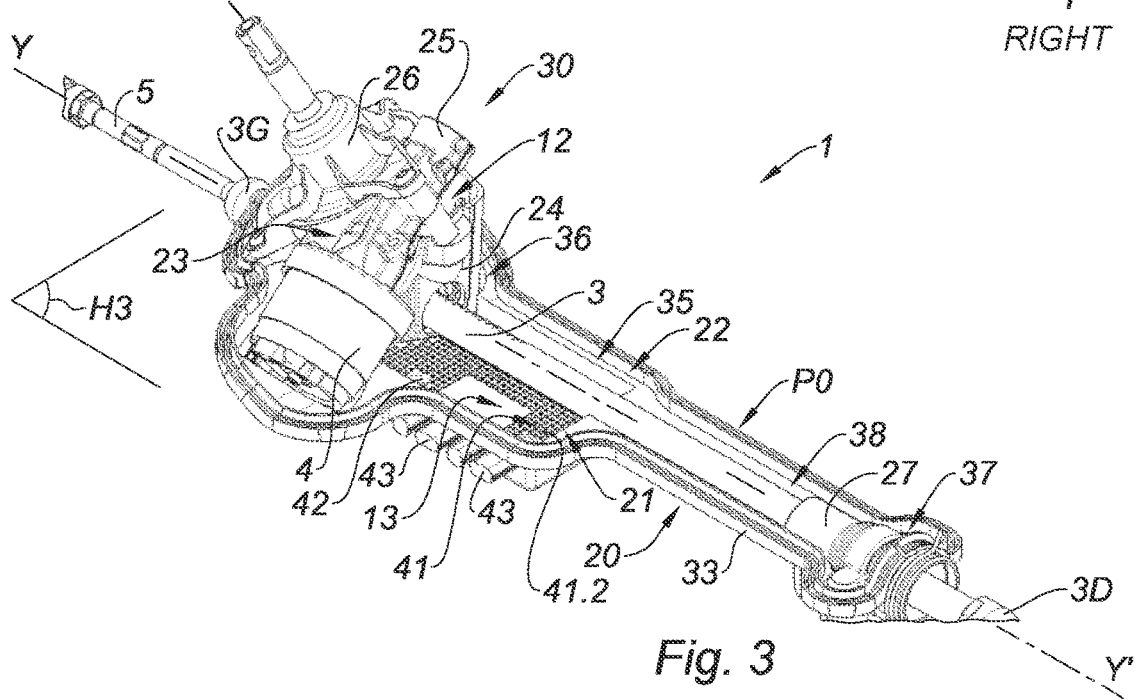

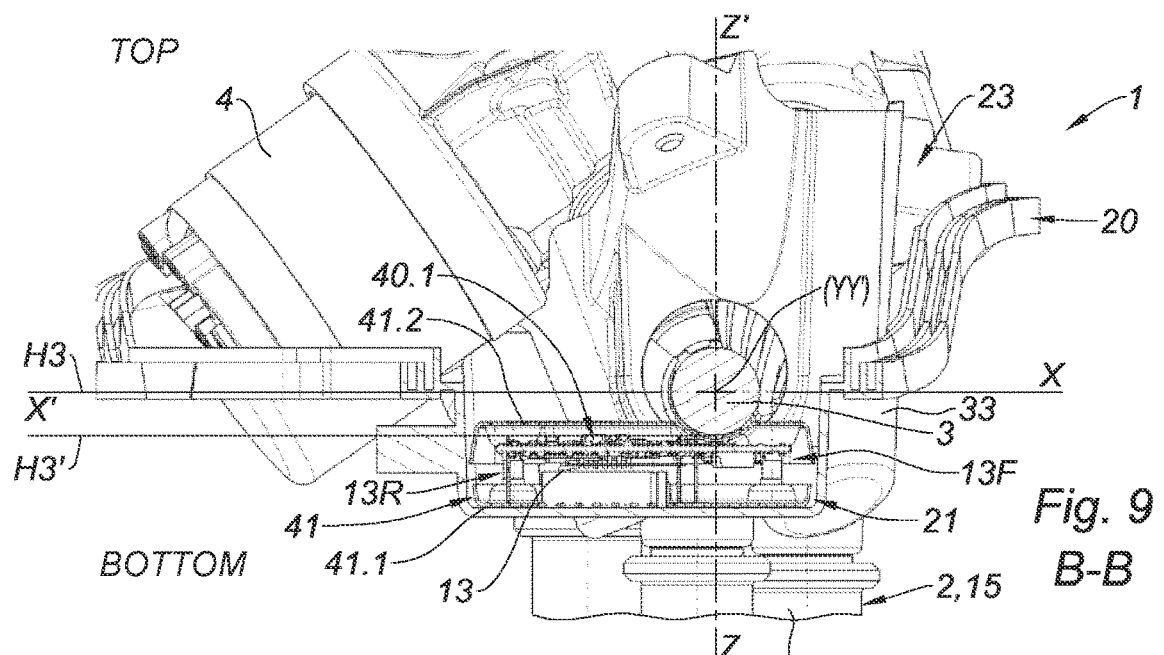
Fig. 9 B-B
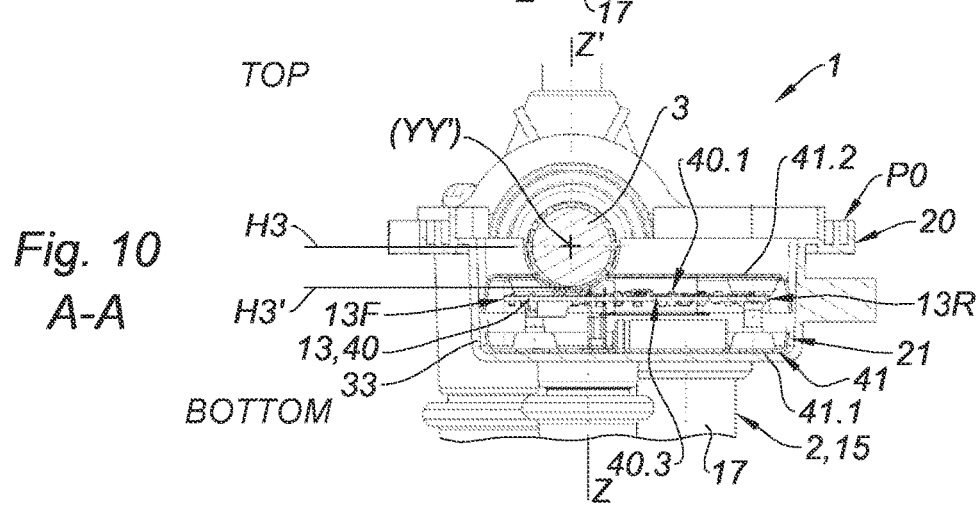
Fig. 10 A-A
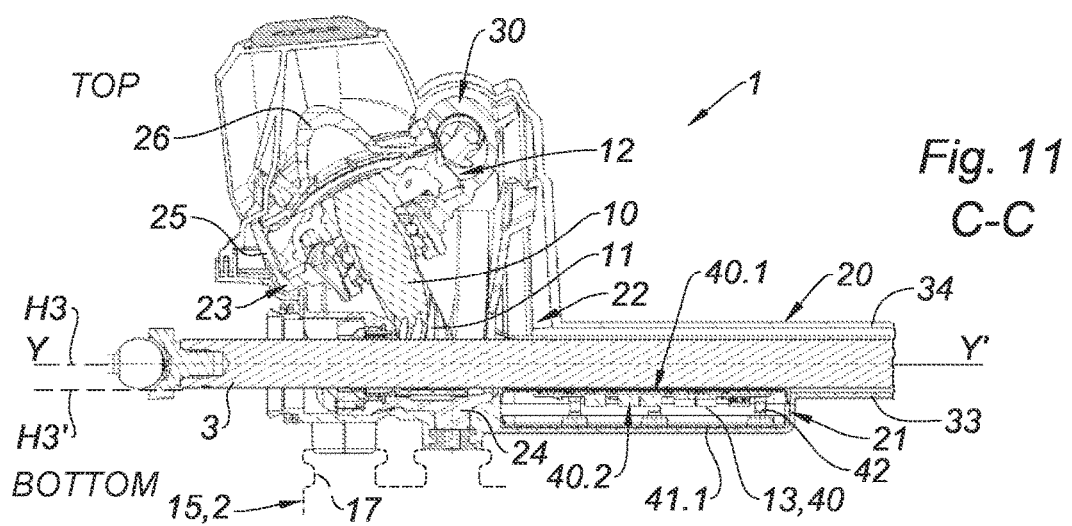
Fig. 11 C-C

POWER STEERING DEVICE WITH A REMOTE COMPUTER UNDER THE RACK

The present invention concerns the general technical field of power steering devices for vehicles, in particular for motor vehicles.

The known power steering devices generally comprise a steering rack, which is mounted movable in translation in a steering case so as to be able to modify the steering angle of the steered wheels of the vehicle, as well as an assist motor capable of driving said rack.

More and more frequently, the assist motor is an electric motor, which is piloted by a calculator which determines, in real-time, and according to predetermined assist laws, a supply setpoint that it applies to said assist motor.

The calculator may be integrated to a central calculator of the vehicle or, more commonly, consist of a distinct electronic circuit.

In any case, the calculator must be housed in a control casing, which protects it in particular from humidity, water projections and dust.

The control casing must itself be placed in the engine compartment of the vehicle, in the vicinity of the assist motor to which it is connected.

Yet, the increasing complexity of the vehicles, and the resulting lack of space in the engine compartment, make the integration of the different members of the vehicle, and in particular of the control casing, in said engine compartment, more and more difficult.

A possible miniaturization of the calculator can be certainly considered, to a certain extent, but such a miniaturization is particularly expensive, and the obtained gain of space remains limited anyway.

Consequently, the objects assigned to the invention aim to propose a new power steering device arrangement, and more generally a new vehicle arrangement, which allows, at a lower cost, improving the compactness of the power steering device and facilitating its integration within a vehicle.

The objects assigned to the invention are achieved by means of a vehicle equipped with a power steering device which comprises at least one steering rack and one assist motor arranged to drive said steering rack, as well as at least one onboard calculator within the vehicle and intended to pilot said assist motor, said vehicle being characterized in that the calculator is mostly, and preferably entirely, placed below the rack.

The objects assigned to the invention are also achieved by means of a power steering device intended to be set up in a vehicle, said power steering device comprising at least one steering rack, one assist motor arranged to drive said steering rack, as well as at least one calculator intended to pilot said assist motor, said device being characterized in that it comprises a shell inside which the rack is guided in translation and inside which a calculator location housing the calculator is formed, so that the calculator is mostly, and preferably entirely, located below the rack, when said device is placed on the vehicle.

Advantageously, disposing the calculator under the rack, at the level of the understructure of said vehicle, in an area of the vehicle, and more particularly in an area of the engine compartment, which is free from other mechanical members, allows avoiding any interference, in particular in the engine compartment, between on the one hand the volume necessary for the calculator to be onboard, and on the other hand the volume necessary to any one of the other members of the vehicle.

Thus, by housing the calculator in an undisputed area, and in particular in an area away from the propulsion engine which ensures the propulsion of the vehicle, the invention allows avoiding the spatial conflicts between the power steering device and the other members of the vehicle, without requiring to reduce at all costs the bulk of said calculator.

Advantageously, the space freed by the transfer of the calculator under the rack may furthermore benefit to other members of the vehicle, and in particular to the engine ensuring the propulsion of the vehicle, which, where appropriate, allows reducing as much the bulk of the engine compartment, and therefore the bulk and the weight of the structure of the vehicle as a whole.

Other objects, features and advantages of the invention will appear in more detail upon reading the following description, as well as with reference to the appended drawings, provided only for an illustrative and non-restrictive purpose, among which:

FIG. 1 illustrates, according to a schematic view, a vehicle equipped with a power steering device according to the invention.

FIG. 2 illustrates, according to a perspective overall view, a variant of the power steering device according to the invention.

FIG. 3 illustrates, according to a perspective partial view, the detail of the set-up of the calculator within the power steering device of FIG. 2.

FIGS. 9, 10 and 11 represent partial sectional views of the device of FIG. 8, respectively, two sectional views perpendicular to the longitudinal axis of the rack, orientated to the left then to the right, and a longitudinal sectional view, along the longitudinal axis of the rack.

Figures 4, 5:
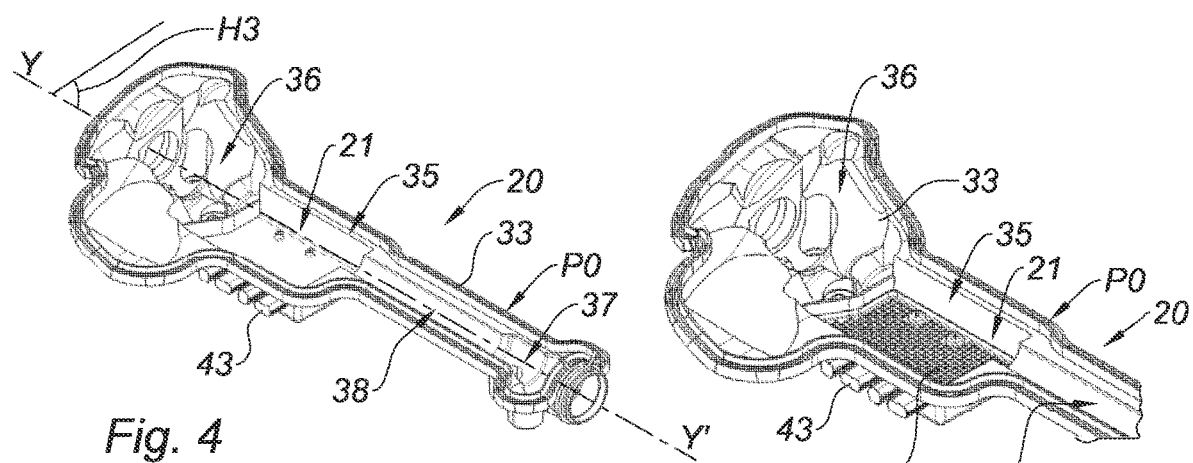
FIG. 4 illustrates, according to a perspective detail view, a base forming the lower portion of the shell which accommodates the steering mechanism within the device of FIGS. 2 and 3, and whose imprint comprises a location for the calculator.
FIGS. 5, 6 and 7 illustrate, according to perspective detail views, the establishment of a first magnetic shield element, then of the calculator, then of a second magnetic shield element in the base of FIG. 4.

The present invention concerns a power steering device 1, and more generally a vehicle 2, such as a motor vehicle, equipped with such a power steering device 1.

As illustrated in FIGS. 1 to 3, the power steering device 1 comprises at least one steering rack 3 (hereinafter «rack») as well as one assist motor 4 arranged to drive said steering rack 3.

In a manner known per se, the steering rack 3 is movably mounted and guided in translation relative to the vehicle 2, according to the longitudinal axis (YY') of said rack 3.

Said longitudinal axis (YY') of the rack is preferably substantially horizontal, and corresponds preferably substantially to the transverse direction (left-right) of said vehicle 2.

The rack 3 is connected, at each of its left 3G and right 3D ends, to a steering tie rod 5, 6 linked to a stub axle carrying a steered wheel 7, 8, so that the displacement in translation of the rack 3 according to its longitudinal axis (YY') allows modifying the steering angle, that is to say the yaw orientation, of the left 7 and right 8 steered wheels (herein the front wheels).

The power steering device 1 also comprises a steering wheel 9 allowing the driver to manually control the maneuver of the rack 3, preferably via a steering column 10 which carries, at one of its ends, the steering wheel 9 and, at its other end, a pinion 11 (FIG. 11) which meshes on said rack 3.

The assist motor 4 will be preferably a double drive direction electric motor (and more particularly with a double direction of rotation).

According to a drive variant called «single-pinion» drive, the assist motor 4 may engage indirectly the rack 3, via the steering column 10, preferably by means of a gear reducer 12, such as a worm wheel and a worm screw reducer, as illustrated in FIG. 1.

According to another possible drive variant, the assist motor 4 may engage directly the rack 3, separately from the steering column 10, by means of a second pinion (to form a mechanism called «double-pinion» mechanism) or by means of a ball screw.

In this respect, it should be noted that the rack 3 can be understood as referring to any maneuver rod actuatable by the assist motor 4 so as to control the steering maneuver of the steered wheels 7, 8, and this, for example, whether the drive of the rack 3 by the assist motor 4 is ensured by a gear mechanism, in which a pinion 11 driven by the assist motor 4 meshes on mating teeth of the rack 3 (as illustrated in FIG. 11), or by a ball screw driven by the assist motor 4 and cooperating with a mating thread formed in the rack 3.

According to the invention, the power steering device 1 also comprises at least one on-board calculator 13 within the vehicle 2 and intended to pilot said assist motor 4.

Said calculator 13 is advantageously designed to pilot the assist motor 4 according to predetermined assist laws, stored in a non-volatile memory of said calculator 13, and which typically enable said calculator 13 to determine a supply setpoint it applies afterwards to the assist motor 4.

Said calculator 13 may be formed by any suitable computer, electronic circuit or programmable logic controller.

According to the invention, and as shown in FIGS. 1 to 3 and 9 to 11, the calculator 13 is mostly, and preferably entirely, placed below the rack 3.

In other words, considering conventionally that the vehicle 2 lies on a horizontal ground HO, the overall volume of the calculator 13, that is to say the space occupied by said calculator 13, is mostly (that is to say at more than 50%, and even preferably at more than 75%) contained, and preferably entirely contained, vertically, that is to say according to the vertical direction (ZZ'), at an altitude lower than that of the longitudinal axis (YY') of translation of the rack 3, and more generally at an altitude lower than the minimum altitude of the material constituting said rack 3.

More particularly, if we consider a horizontal first gauge plane H3 (that is to say parallel to the ground HO on which the vehicle 2 lies), containing the longitudinal axis (YY') of the rack 3, and even if we consider a second gauge plane H3' parallel to said longitudinal axis (YY') of the rack and tangent to the lower edge of the rack 3, then the calculator 13 is mostly, and preferably entirely, located under said first gauge plane H3, respectively under said second gauge plane H3', that is to say mostly and preferably integrally contained within the half-space delimited by said gauge plane H3, respectively H3', and located below said gauge plane H3, H3', that is to say in practice comprised between the ground HO (low altitude limit) and said gauge plane H3, H3' (high altitude limit).

Advantageously, this vertical offset of the calculator 13 below the rack 3, in a low area, generally free on the majority of known vehicles, allows clearing the space above the rack 3, that is to say above the gauge plane H3, H3', and consequently freeing space for other members of the vehicle 2, such as for example a propulsion engine 14 intended to ensure the propulsion of the vehicle 2.

The set-up of the power steering device 1, as well as the set-up of the members of the vehicle 2 which surround said power steering device 1, are thus facilitated.

The accessibility to said power steering device 1 or to the neighboring members is also improved thanks to the arrangement proposed by the invention, which may simplify the assembly or the repair of the vehicle 2.

Moreover, besides the fact that the calculator 13 is located below the rack 3, that is to say that mostly or entirely occupies an altitude range lower than the altitude of the rack 3, and more particularly lower than the altitude of the longitudinal axis (YY') of the rack, the calculator 13 is also preferably located at least partially (vertically) in line with the rack 3, as shown in FIGS. 1, 9 and 10, so that, in vertical projection (for example in projection in the horizontal plane of the ground HO), the projected surface covered by the calculator 13 has at least one overlapping area with the projected surface of the rack 3.

In other words, when viewed from the top (or from the bottom), in a horizontal plane perpendicular to the vertical direction (ZZ') of projection, the rack 3 impinges on the calculator 13 (and vice versa), due to the fact that the rack 3 and the calculator 13 meet and overlap at least partially.

More particularly, the calculator 13 may be disposed under the rack 3 so that, as shown in FIGS. 9 and 10, the front edge 13F of the calculator 13 protrudes (horizontally) at the front of the rack 3, whereas the rear edge 13R of said calculator 13 protrudes (horizontally) at the rear of the rack 3, in the front-rear longitudinal direction (XX') of the vehicle 2.

Advantageously, such a horizontal centering, or quasi-centering, of the calculator 13, in line with the rack 3, allows optimizing the compactness of the power steering device 1, by reducing the overall bulk of said device 1 according to the front-rear longitudinal direction (XX') of the vehicle 2.

As shown in FIGS. 1 and 9 to 11, the vehicle 2 has a body understructure 15.

In a conventional manner, such an understructure may in particular comprise one or several side members 16, which extend substantially according to the front-rear longitudinal direction (XX') of the vehicle, and which are linked by cross-members (not represented).

Preferably, the body understructure 15 comprises at least one cradle 17 which is disposed transversely to the longitudinal direction (XX') of the vehicle.

Said cradle 17 supports advantageously a running gear, herein the front running gear in FIG. 1, said running gear being provided with steered wheels 7, 8 whose yaw orientation is controlled by the rack 3, as described hereinabove.

In a particularly preferred manner, the cradle 17 is disposed under a compartment 18 of the vehicle.

Said compartment 18 may preferably form an engine compartment, which accommodates a propulsion engine 14 intended to propel the vehicle, as represented in FIG. 1.

Alternatively or complementarily, the compartment 18 may form, according to a non-represented variant, a (free) luggage compartment, intended to accommodate any luggage, for example a suitcase.

In a particularly preferred manner, the cradle 17 forms all or part of the lower bottom of the compartment 18, so that the upper face of the cradle 17 opens onto said compartment 18 and, preferably, in the case of an engine compartment, so that the upper face of the cradle 17 opens under the propulsion engine 14, at an altitude lower than that of said propulsion engine 14, and where appropriate at least partially vertically to the propulsion engine 14.

Preferably, the power steering device 1 is then fastened on said cradle 17, and more particularly at the upper surface of said cradle 17, so that the rack 3 is orientated toward the compartment 18 (that is to say toward the inside of the main volume of said compartment 18, hence, herein, upwards), whereas the calculator 13 is mostly, and preferably entirely, placed below said rack 3, so as to be orientated opposite to the compartment 18 with respect to said rack 3, herein downwards, toward the body understructure 15 of the vehicle and toward the ground HO on which the vehicle 2 circulates.

Advantageously, the invention therefore allows placing the calculator 13 set-back (herein set-back at the bottom) from the compartment 18, in order to clear and preserve the functional space, and more particularly the main useful volume (intended for the propulsion engine 14 and/or for the luggage), of said compartment 18.

It should be noted that, preferably, the propulsion engine 14, if the compartment 18 is an engine compartment, or respectively the free volume intended to accommodate luggage, if the compartment 18 is a luggage compartment, is mostly (at more than 50%), and preferably integrally, located above the second gauge plane H3' (tangent to the base of the rack 3), and even above the first gauge plane H3 (containing the longitudinal axis (YY') of the rack 3), that is to say at an altitude higher than that of the considered gauge plane H3, H3'.

Preferably, as shown in particular in FIGS. 2, 3, 8, 9 and 11, the power steering device 1 comprises a shell 20 inside which the rack 3 is guided in translation.

In a particularly preferred manner, as illustrated in particular in FIGS. 3, 4 and 9 to 11, said shell 20 comprises a calculator location 21 arranged to accommodate the calculator 13 inside said shell 20, under the rack 3.

Advantageously, this arrangement allows simplifying the assembly of the power steering device 1, and effectively protecting the calculator 13 from external aggressions.

More particularly, as shown in particular in FIG. 11, the shell 20 preferably delimits an enclosure 22, which is crossed by the rack 3 and in which the calculator 13, and preferably the assist motor 4, is enclosed, which enclosure 22 is advantageously impermeable at least to the penetration of liquid water and salt spray.

By «salt spray», is meant the salty water droplets in suspension in the air, which may appear in particular when the vehicle 2 circulates in the proximity of a marine littoral, or on a snowy road treated with salt.

Preferably, the enclosure 22 is impermeable to the penetration by runoff or by projection not only of liquid water, but also of other foreign liquid bodies, which may come from other members of the vehicle, such as engine oil, fuel, windshield washer liquid, etc. as well as to the penetration of solid foreign bodies such as dust or aggregate.

The elements, such as the calculator 13, and where appropriate the assist motor 4, which are protected by the shell 20, sheltered inside the enclosure 22, are thus effectively protected from corrosion, fouling, and impacts.

In this respect, it should be noted that the interfaces of the shell 20 enabling functional communications between the enclosure 22 and the outside of the power steering device 1 are advantageously provided with sealing members, such as gaskets, for example made of elastomer.

Thus, for example, as shown in FIG. 2, the steering tie rods 5, 6 linked at the ends 3G, 3D of the rack 3 emerge from the shell 20 at sealed interfaces fitted with flexible and expandable bellows 31, 32, preferably made of elastomer.

Furthermore, the shell 20, advantageously rigid, facilitates the handling and the (overall) manipulation of the power steering device 1 when said device 1 must be supplied on the production line and integrated in the vehicle 2.

Advantageously, the enclosure 20 shared by the calculator 13, the assist motor 4, and a portion of the rack 3, also encloses a rigid carrier structure 23 (or «framework»), which supports the assist motor 4 and guides the rack 3 in translation.

As illustrated in FIGS. 3 and 11, said carrier structure 23 may in particular comprise a first subassembly 30 formed by a stack of preferably metallic cases 24, 25, 26, namely a first steering case 24, which guides the rack 3, a reducer case 25, to which the assist motor 4 is fastened and which contains the reducer 12 enabling said assist motor 4 to drive the steering column 10, and a torque sensor case 26 which contains a torque sensor measuring, for example by the deformation of a torsion bar, the torque called «steering wheel torque» exerted by the driver on the steering wheel 9.

The carrier structure 23 may also include, as shown in FIG. 3, a second steering case 27, distinct and distant from the first steering case 24, and more generally distinct and distant from the first subassembly 30, and which forms a planet bearing completing the translational guidance of the rack 3.

The carrier structure 23 and the rack 3 are advantageously disposed in the shell 20, above the calculator location 21, sheltered in the enclosure 22 which isolates them from the environment of the power steering device 1.

Preferably, as illustrated in particular in FIGS. 2 and 11, the shell 20 is formed by the combination, according to a parting plane P0, of at least one lower first shell portion, called «base» 33, and one upper second shell portion, called «bell-housing» 34, which are attached and fastened to each other on either side of the rack 3, so as to cover the rack 3 respectively from below and from above.

It should be noted that, preferably, the parting plane P0, which marks the separation between the base 33 and the bell-housing 34, is substantially parallel to the longitudinal axis (YY') of the rack 3, and even substantially horizontal (and for example at least partially, and even mostly, substantially contained in the first gauge plane H3), so that the base 33 is contained below the parting plane P0, whereas the bell-housing 34 is contained above said parting plane P0.

Such a partitioning of the shell into a base 33 and a bell-housing 34, initially distinct from the base 33, and which covers said base 33 to close the shell 20, in order to delimit the enclosure 22, allows in particular simplifying the manufacture of the shell 20 and the assembly of the power steering device 1.

In particular, as illustrated in FIG. 3, such an arrangement will allow disposing the base 33 on a mounting support («marble»), the opening of said base 33 being directed upwards, in order to afterwards attach and fasten in said base 33 the members of the power steering device 1, and more particularly the calculator 13, the assist motor 4, the rack 3, and more generally the aforementioned carrier structure 23.

In this respect, the calculator location 21 is preferably formed by a portion of an imprint 35 which is formed recessed in the base 33 and which opens onto the parting plane P0 (hence, in this instance, upwards).

Similarly, as shown in particular in FIGS. 3 and 4, the imprint 35 of the base 33 may advantageously include one or more location(s) 36, 37 for the carrier structure 23, and more particularly a location 36 for the first steering case 24 and a location 37 for the second (planet) steering case 27, as well as a location 38 for the passage of the rack 3.

Preferably, as shown in FIGS. 3 and 4, the location 38 for the passage of the rack 3 will extend substantially parallel to the longitudinal axis (YY') of the rack 3 and will be interposed longitudinally between the location 36 for the first steering case and the location 37 for the second steering case. Said location 38 for the passage of the rack will preferably have a semi-cylindrical shape.

Preferably, in particular to facilitate the manufacture of the base 33 by molding, all these locations 21, 36, 37, 38 will be formed recessed within the same imprint 35, and all will open onto the parting plane P0, and even all will communicate with each other, so that the rack 3, the calculator 13 and the assist motor 4, and even the carrier structure 23 in general, will lie in a same common enclosure 22.

With respect to the parting plane P0 (and therefore with respect to the first gauge plane H3), the calculator location 21 will be advantageously deeper than the location for the passage of the rack 38, so as to enable the installation of the calculator 13 in the (lower) bottom of the imprint 35 of the base 33, below the rack 3, and therefore (directly) in line with said rack 3.

Similarly, it should be noted that the calculator 13 will be advantageously placed below the assist motor 4, and below the reducer 12 and the reducer case 25 (i.e. at an altitude lower than these elements).

Indeed, as illustrated in particular in FIG. 9, the assist motor 4 is preferably mostly, and even entirely, placed at an altitude higher than the (overall) altitude range occupied by the calculator 13, in the half-space which is opposite to the half-space in which said calculator 13 is located, with respect to the first gauge plane H3.

Similarly, as illustrated in particular in FIG. 11, the reducer 12, respectively the reducer case 25, is preferably mostly, and more preferably entirely, placed at an altitude higher than the (overall) altitude range occupied by the calculator 13, in the half-space which is opposite to the half-space in which said calculator 13 is located, with respect to the first gauge plane H3.

More generally, it should be noted that, thanks to the invention, the calculator 13 can be offset at a (great) distance from the assist motor 4, and where appropriate from the reducer 12, without being contiguous to the latter.

Advantageously, the dissociation and the spatial separation of the assist motor 4 and of the calculator 13 allows in particular using a calculator 13 whose surface area is particularly wide, and for example whose length (and/or width) is larger than the overall width of the assist motor 4 (considered perpendicularly to the shaft of said motor), since the bulk of said calculator 13 is neither correlated with the dimensions of the assist motor 4, nor a fortiori limited by the dimensions of the assist motor 4.

Indeed, thanks to said spatial dissociation, there is no construction constraint that requires including said calculator 13 in the extension of the assist motor 4, inside an envelope (fictional or materialized by a case) whose overall dimensions would not exceed the overall dimensions of the envelope of said assist motor 4 (and in particular the overall diameter of the assist motor).

Thus, the invention allows avoiding the need for a miniaturized calculator, which would be more expensive than a large-size calculator.

Once the members of the power steering device 1 will be placed, and where appropriate fastened, in the base 33, the bell-housing 34 will be afterwards attached on the base 33, so as to cover the calculator 13, the assist motor 4, and more generally the carrier structure 23, then said bell-housing 34 will be fastened to said base 33, for example by bonding or by thermos-welding, according to a sealed junction (in particular impermeable to liquid water and to salt spray) which follows the course of the parting plane P0.

Preferably, the base 33 and/or the bell-housing 34 will be preferably made integrally of a polymer material, and more preferably of a thermoplastic polymer allowing a manufacture by injection molding.

As example, it is possible to use to this end a Polyamide (PA), an aromatic Polyamide (PPA), a Polybutylene Terephthalate (PBT), a Polyethylene Terephthalate (PET), a Polypropylene (PP), or a Polyketone (PK).

Preferably, the used polymer material may be reinforced with fibers, for example glass, carbon or aramid fibers, or any mixture of fibers containing at least two of these categories of fibers.

The polymer material(s) used to form the base 33 and/or respectively the bell-housing 34 will be chosen so as to be rigid or semi-rigid, that is to say so as to typically have a Young's modulus greater than 3 GPa, at least over the predictable range of operating temperature of the power steering device 1, that is to say at least over the range comprised from −40° C. to +125° C.

The rigidity of the shell 20 will advantageously guarantee an effective mechanical protection of the device 1, and more particularly of the assist motor 4 and of the calculator 13, in particular against the impacts of solid bodies (grit), while facilitating the manipulation of the device 1 during its set-up within the vehicle 2.

Although it is preferred to house the calculator 13 in the same shell 20 as the rack 3 and the assist motor 4, in particular for economic reasons and to simplify the assembly of the power steering device 1, it should be noted that it can be perfectly considered, alternatively, and without departing from the scope of the invention, that the calculator 13 is placed in a separate protective casing, distinct and distant from the shell 20 receiving the rack 3 and the assist motor 4, so that said calculator 13 would not share said shell 20 (and in particular not the enclosure 22) with the rack 3 and the assist motor 4.

Figures 6, 7:
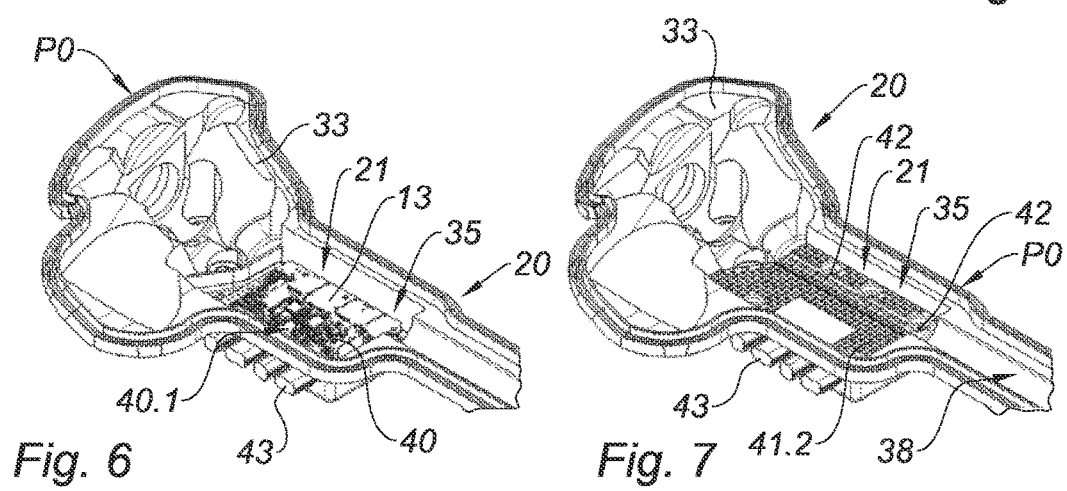
Figure 8:
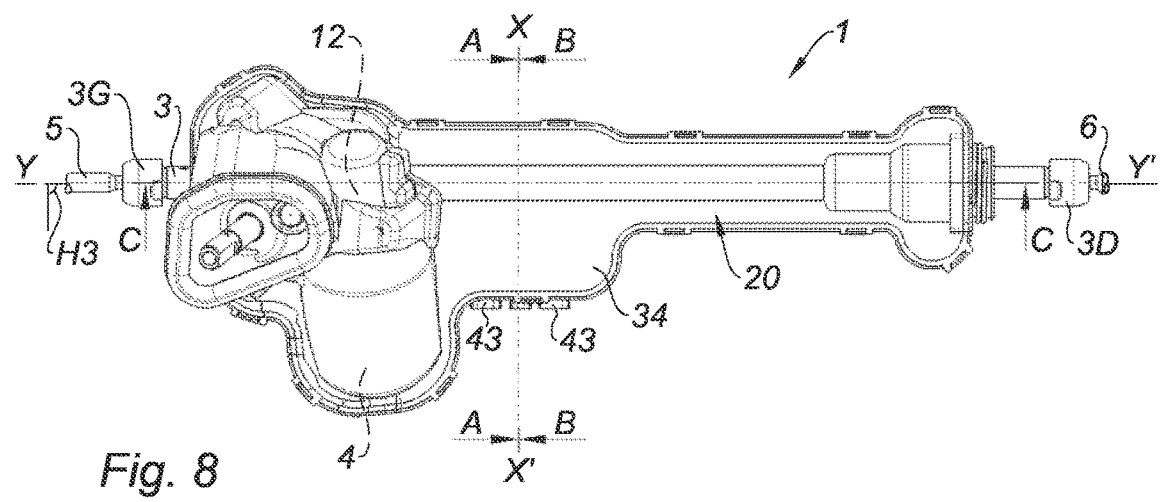
FIG. 8 shows the device of FIGS. 2 and 3 viewed from the top.

Preferably, whether the calculator 13 is placed in the shell 20 that accommodates the assist motor 4 or outside of said shell 20, in a separate «planet» protective casing, the calculator 13 is, as shown in particular in FIG. 6 or FIG. 11, in the form of an electronic board 40 or of a substantially parallelepiped electronic casing, (or at least included in a parallelepiped shape), which has an upper (herein substantially horizontal) face 40.1 wider than its lateral faces 40.2, 40.3 (herein substantially vertical).

In other words, for compactness reasons, the calculator 13 preferably has a relatively "flattened" shape, the space occupied by said calculator 13 extending mainly according to two (herein horizontal) dimensions, namely in width according to (XX') and in length according to (YY'), each of these two dimensions being several times larger than the third dimension (thickness), herein considered according to the vertical (ZZ').

Whether the calculator 13 is disposed outside the shell 20 or, preferably, inside said shell 20, said calculator 13 is then preferably disposed in a flattened manner under the rack 3, its upper face 40.1 being substantially horizontal.

In other words, the attitude of the calculator 13, that is to say its roll and/or pitch inclination with respect to the horizontal (and hence with respect to the first gauge plane H3) will be preferably larger than 30 degrees, 20 degrees, 10 degrees and even 5 degrees.

Such an arrangement of the calculator 13 "in a flattened manner" under the rack 3, and substantially parallel to the longitudinal axis (YY') of said rack 3, will advantageously allow using effectively the free space located under said rack 3, while offering a solid and stable holding of the calculator 13.

When the calculator 13 is housed in the imprint 35 of the base 33, such a "flattened" arrangement simplifies the mounting of the calculator 13 in the shell 20 and contributes to limit the depth necessary to the location for the calculator 21, and consequently contributes to reduce the overall bulk of the shell 20 and more generally the overall bulk of the power steering device 1.

Moreover, the calculator 13 is preferably surrounded and protected by an electromagnetic shield 41.

Advantageously, such a shield forms a Faraday cage which, by interposing an electrically-conductive screen between the calculator 13 and its environment, avoids the interferences between said calculator 13 and its environment.

Preferably, as illustrated in FIGS. 5 and 9 to 11, said electromagnetic shield 41 comprises a lower first conductive ply 41.1, formed by a first sheet or a first grid made of an electrically-conductive material and placed below the calculator 13.

Advantageously, said preferably planar first conductive ply 41.1 will be placed and fastened to the bottom of the imprint 35 of the base 33, in order to overlay the bottom of the location for the calculator 21, before the calculator 13 is in turn attached over said first conductive ply 41.1, in this same location for the calculator 21.

Preferably, as illustrated in particular in FIGS. 3, 7 and 9 to 11, the electromagnetic shield 41 also comprises an upper second conductive ply 41.2, which is preferably distinct from the first conductive ply 41.1, and which is formed by a second sheet or a second grid made of an electrically-conductive material, and placed above the calculator 13, between the calculator 13 and the rack 3.

Advantageously, the second conductive ply 41.2 is brought to cover the calculator 13 after the latter has been laid on the first conductive ply 41.1, in the location for the calculator 21, and before the establishment of the rack 3 and of the carrier structure 23, as illustrated in FIG. 7.

Advantageously, such a stratified structure, comprising successively (in the vertical order) a first layer formed by the first ply 41.1, a second layer formed by the calculator 13, and a third layer formed by the second ply 41.2, is particularly inexpensive to manufacture, and particularly easy to assemble by simple stacking of said layers.

Thus, it is possible to integrate, easily and in a very stable manner, the electromagnetic shield 41 to the enclosure 22, sheltered inside the shell 20, and therefore closest to the calculator 13 in order to guarantee an optimum electromagnetic protection.

As shown in FIG. 7, the calculator 13, and more generally the "sandwich" formed by the calculator 13 enveloped by all or part of its electromagnetic shield 41, may be fastened to the shell 20, and thus secured (directly, or indirectly via the base 33) to the carrier structure 23, by means of fastening screws 42.

Moreover, the shell 20, and more particularly the base 33, may be provided with impermeable connectors 43, forming electrical connection interfaces between the calculator 13 and the outside of the shell 20 (the outside of the device 1), in particular in order to enable the connection of the calculator 13 to the battery of the vehicle and to the onboard computer network of the vehicle («Controller Area Network»).

Of course, the invention also concerns as such a power steering device 1 allowing housing the calculator 13 in an offset manner, away from the assist motor 4, under the rack 3.

In this respect, the invention concerns as such a power steering device 1 intended to be set up in a vehicle 2, said power steering device 1 comprising at least one steering rack 3, one assist motor 4 arranged to drive said steering rack 3, as well as at least one calculator 13 intended to pilot said assist motor 4, said device 1 comprising a shell 20 inside which the rack 3 is guided in translation and inside which a calculator 21 location housing the calculator 13 is formed, so that the calculator 13 is mostly, and preferably entirely, located below the rack 3, when said device 1 is placed on the vehicle 2.

Preferably, as described hereinabove, (both) the calculator 13 and the assist motor 4 are located inside the shell 20, in the same enclosure 22 also crossed by the rack 3.

In other words, the assist motor 4, the calculator 13, as well as a portion of the rack 3 under which the calculator 13 takes place, preferably share a same common enclosure 22, impermeable to liquid water and to salt spray, as well as where appropriate to other liquid or solid foreign bodies, which enclosure 22 is comprised between (and delimited by) the base 33 and the bell-housing 34 which caps said base 33.

Of course, the invention is in no way limited to the sole variants described in the foregoing, those skilled in the art being in particular capable of freely isolating or combining together either of the aforementioned features, or substituting them with equivalents.

The invention claimed is:

1. A vehicle comprising:
   a power steering device including:
      at least one steering rack,
      one assist motor arranged to drive the at least one steering rack, and
      a shell guiding the rack in a translational movement within the shell, the shell being formed by a combination of, according to a parting plane, at least one lower first shell portion and at least one upper second shell portion, the lower first shell portion and the upper second shell portion are attached and fastened to each other on either side of the at least one steering rack, so as to cover the at least one steering rack respectively from below and from above; and
   at least one onboard processor disposed within the vehicle, the at least one onboard processor being programmed to control the assist motor, the at least one onboard processor being located below the at least one steering rack, and the at least one onboard processor is located in a calculator location in the shell, which is arranged to accommodate the at least one onboard processor inside the shell and under the at least one steering rack, the calculator location being formed by a portion of an imprint that is formed recessed in the lower first shell portion and which opens onto the parting plane.

2. The vehicle according to claim 1, wherein:
   the vehicle has a body understructure including at least one cradle disposed transversely to a longitudinal direction of the vehicle, the at least one cradle being located under a compartment of the vehicle that forms (i) an engine compartment accommodating a propulsion engine configured to propel the vehicle, or (ii) a luggage compartment configured to accommodate luggage, the at least one cradle supporting a running gear provided with steered wheels having yaw orientation controlled by the at least one rack, and the power steering device is fastened on the at least one cradle so that the at least one rack is orientated toward the compartment, and the processor is orientated at a location that is opposite to the compartment with respect to the at least one rack, and located toward the body understructure of the vehicle and toward a ground on which the vehicle circulates.

3. The vehicle according claim 1, wherein the processor is located at least partially in line with the at least one rack, so that, in vertical projection, a projected surface covered by the processor has at least one overlapping area with a projected surface of the at least one rack.

4. The vehicle according to claim 1, wherein the processor is in a form of an electronic board or of a substantially parallelepiped electronic casing which has an upper face wider than lateral faces of the processor, is the processor being disposed in a flattened manner under the at least one rack, and an upper face of the processor is horizontal.

5. The vehicle according to claim 1, wherein the processor is surrounded and protected by an electromagnetic shield that includes (i) a lower first conductive ply formed by a first sheet or a first grid made of an electrically-conductive material and placed below the processor, and (ii) an upper second conductive ply, which is different from the first conductive ply, and the upper second conductive is formed by a second sheet or a second grid made of an electrically-conductive material and placed above the processor between the processor and the at least one rack.

6. A power steering device intended to be installed in a vehicle, the power steering device comprising:

at least one steering rack;

one assist motor arranged to drive the at least one steering rack;

a shell guiding the rack in a translational movement within the shell, the shell being formed by a combination of, according to a parting plane, at least one lower first shell portion and at least one upper second shell portion, the lower first shell portion and the upper second shell portion are attached and fastened to each other on either side of the at least one steering rack, so as to cover the at least one steering rack respectively from below and from above; and at least one processor configured to control the assist motor, the at least one processor being located in a calculator location in the shell, which is arranged in the shell, the processor being located below the at least one rack, when the power steering device is located in the vehicle, the calculator location being formed by a portion of an imprint that is formed recessed in the lower first shell portion and which opens onto the parting plane.

7. The device according to claim 6, wherein the processor and the assist motor are located inside the shell, in the same enclosure crossed by the at least one steering rack.

* * * * *